United States Patent [19]

Schmutz

[11] Patent Number: 5,033,597

[45] Date of Patent: Jul. 23, 1991

[54] CLUTCH WITH ELASTIC COUPLING FOR MACHINE CONVERTING PLATE-SHAPED ELEMENTS

[75] Inventor: Bernard Schmutz, St. Legier, Switzerland

[73] Assignee: Bobst SA, Switzerland

[21] Appl. No.: 482,275

[22] Filed: Feb. 20, 1990

[30] Foreign Application Priority Data

Feb. 20, 1989 [CH] Switzerland ............... 00593/89

[51] Int. Cl.⁵ .................. F16D 13/22; F16D 25/04
[52] U.S. Cl. .................. 192/70; 192/70.18; 192/70.19; 192/85 AB; 192/106.1
[58] Field of Search ............ 192/70, 85 AB, 88 A, 192/70.18, 70.19, 70.28, 106.1

[56] References Cited

U.S. PATENT DOCUMENTS

| | | | |
|---|---|---|---|
| 3,353,638 | 11/1967 | Smoll | 192/85 AB X |
| 3,547,243 | 12/1970 | Joern et al. | 192/70 |
| 3,584,717 | 6/1971 | Suppes et al. | 192/70 |
| 3,777,865 | 12/1973 | Walter et al. | 192/70 |
| 3,981,382 | 9/1976 | Bolliger | 192/150 |
| 4,434,883 | 3/1984 | Raines | 192/85 AB X |

Primary Examiner—Richard Lorence
Attorney, Agent, or Firm—Hill, Van Santen, Steadman & Simpson

[57] ABSTRACT

A clutch arrangement includes a hub connected by identical stacks of lamellae to a plate and counter-plate with friction pads which plates are urged by a pneumatic system into engagement on clutch surfaces of flanges of the other shaft. The hub has a polygonal shaped periphery of two or more rounded corners connected by concave sides and each of the plates has an aperture of the same configuration receiving the hub with a cylindrical support for receiving the end of a stack of lamellae disposed midway between each pair of corners. Thus, the plates can be easily moved axially relative to the hub but are rigidly connected to the hub for transferring rotary motion therebetween.

11 Claims, 5 Drawing Sheets

CLUTCH WITH ELASTIC COUPLING FOR MACHINE CONVERTING PLATE-SHAPED ELEMENTS

BACKGROUND OF THE INVENTION

The present invention is directed to a clutch which is fitted on the outlet of a main motor of a machine for use for converting plate-shaped elements, such as strong paper, flat paperboard or sheets of corrugated board. On account of the power being applied, such a clutch is usually actuated by means of a fluid acting on a membrane moving along an adopted axis of the clutch assembly, which assembly is provided with the friction surfaces. Another feature of the clutch is that the coupling system used between the clutch element and its rotary axle is elastic.

By way of principal, a clutch includes a flange permanently fitted on a first shaft or flywheel and a plate holding a friction disk which is fitted on a second shaft is positioned coaxially to the first shaft or flywheel in such a way that the plate is fixed for rotation with the second shaft but can be axially moved with regard to the second shaft. As may be easily understood, the clutching-in action consisted of shifting the plate towards the flange until the friction disk of the plate makes contact with the flange. The friction forces occurring when the friction disk and flange are in contact with one another enables the transmission of the torque from the first driving shaft or flywheel to the second driven shaft, or in an opposite direction, if the second shaft is the driving part. The permanent position of the clutch is usually insured by springs or other pullback means whereas the temporary position is obtained by means of a mechanical device of purely kinematic execution or else involves a fluid, such as compressed air or hydraulics. For instance, in an automobile clutch, which is supposed to remain permanently engaged, radial springs with their seats on a hub sliding along the second shaft are connected to pivots on the inner periphery of the housing to exert pressure against the side of the plate to urge it towards the flange connected to the motor. When the pedal is actuated, the hub is shifted in a direction which causes the springs to pull the plate away from the flange and move it along the second axle or shaft to disengage the clutch.

In the event of large power transfers put to work, it might be useful to double the clutch, which would then include two flanges held in parallel and apart from one another by a peripheral distance piece. The assembly is such that the two plates are coaxially fitted on a first shaft or flywheel. This clutch includes an addition of a plate and counter-plate, which are fitted coaxially on a second shaft between the two flanges. As a rule, the plate and counter-plate are close to one another when in a declutched or disengaged position by appropriate springs whereas pistons are positioned between the plate and counter-plate for the purpose of moving them apart from one another as requested when engaging the plates with the surfaces of the flanges. Hence, if trouble appears on the machine, especially so on a hydraulics circuit, a pull-back means will automatically disengage the clutch.

Both examples mentioned above show the importance of easy sliding of the plates that hold the clutch friction disk on a rotary shaft. This problem has been resolved by cutting a row of lengthwise teeth or splines into the periphery of the shaft. Teeth matching those on the shafts will be cut into the inner circular section of the plate or plates. In this way, an insertion of the plate or plates along the shaft can easily occur with the teeth of the plates meshing with the teeth of the shaft. In this way, the plate is fixed when rotated but free to move axially along the shaft.

Any difficulties likely to arise with this arrangement are reduced by high-precision rectification of the teeth after their cutting in order to eliminate, if possible, any backlash. Moreover, the support of the second shaft is carefully greased in order to reduce as much as possible the friction forces occurring in this area during the axial movement of the plate element along the shaft.

Even though satisfactory up to a medium power rate, this mode of coupling the plate on the shaft becomes inadequate with high potential clutches resulting initially in teeth knocking against one another and leading to backlash. Once this backlash has become sufficiently large, it will cause jarring when the clutches are engaged with vibrational-like shocks propagated harmfully through the whole machine. The backlash area will then develop contact erosion which will considerably increase the frictional forces to be overcome when having the plate shifted by the actuating means, such as the piston or a fork, or by a reactive pull-back means. This appearance of the increased friction will result in a slower clutch response to a command which is particularly dangerous in the event of an emergency disengagement of the clutch.

SUMMARY OF THE INVENTION

The purpose of the present invention is to resolve the above-mentioned problems, and especially so on a clutch used with the machine converting plate-shaped elements. Such a clutch is expected to be compulsory free from clearance problems between the plate and the hub so as to insure great torsional sturdiness with prompter machine response when starting up or stopping and have a considerable less amount of vibration risk. Moreover, the clutch response time should be short especially so by lowering or discarding frictional forces likely to develop. Finally, such a clutch should not necessitate the setting and changing of parts before long periods and only on account of increase use of the friction disk due to longer strokes of the plates along their shaft.

These objects are achieved by means of an improvement in a clutch arrangement comprising two circular flanges held in spaced-apart parallel arrangement by struts or circular wall arranged on the periphery of the flanges, one of the flanges being coaxially fitted on a first shaft or flywheel, a circular plate and counter-plate with a diameter smaller than the flanges, mounting means for coaxially fitting the plates on a second shaft between the two flanges in such a way that they will executed a common rotation therewith but are shiftable with an axial translation along the second shaft, both the plate and the counter-plate having a friction disk on a surface facing the respective flanges, means for urging the plate and counter-plate apart to keep the friction disks engaged with respective flanges, said means including an at least one expansible chamber or one chamber expansible under pressure of a fluid, and pull-back means extending between the plate and counter-plate for urging the plate and counter-plate together axially along the second shaft against the pressure of said expansible chamber. The improvements are the mounting means includes a hub keyed to the second shaft and having a peripheral surface of an oval or polygon shape with at least two rounded corners and concave sides extending between the corners, each of said plate and counter-plate having an aperture having an inner periphery corresponding to the periphery of the hub and of a slightly larger size to enable receiving the hub within said aperture with a cylindrical support midway between adjacent corners, a stack of identical lamellae connecting respectively the surface of the hub at each of its rounded corners to the cylindrical support of the adjacent plate, said stacks forming an enclosed figure of at least four sides to interconnect the end of said plate and counter-plate to said hub.

According to a mode preferably adopted for the realization, the periphery of the hub as viewed in a crosswise section is practically equivalent to a shape definable by the equation in polar coordinates of $$P(r) = R1 + R2 \sin(n\Theta)$$

in which $\Theta$ adopts a value between 0 and 2 pi, n being a whole number contained between 2 and 6 and the correlation R1/R2 is in a range between 0.2 and 0.35.

In an advantageous design, the distance between the axis of the second shaft and the axis of the cylindrical cylinder around which the lamellae are piled up at on one of the hub corners should be in a range between 0.4 and 06 times the plate radius.

A similar advantage would be provided by lamellae held at an adequate distance from the front or the rear side of the hub or the plate, as well as from means for holding these lamellae against the hub or plate with the help of a distance piece having a shape of an isosceles triangle, the apex of which is directed towards the rotary axis of the clutch and is equal to 180°/n, where n is the number included in the above-mentioned formula characterizing the outer shape of the hub and is equal to the number of rounded corners of the periphery of the hub. Since the hub has at least two corners, $n \geq 2$.

Other advantages and features of the invention will be readily apparent from the following description of the preferred embodiment, the claims and drawings.

DESCRIPTION OF THE PREFERRED EMBODIMENTS

Figure 1:
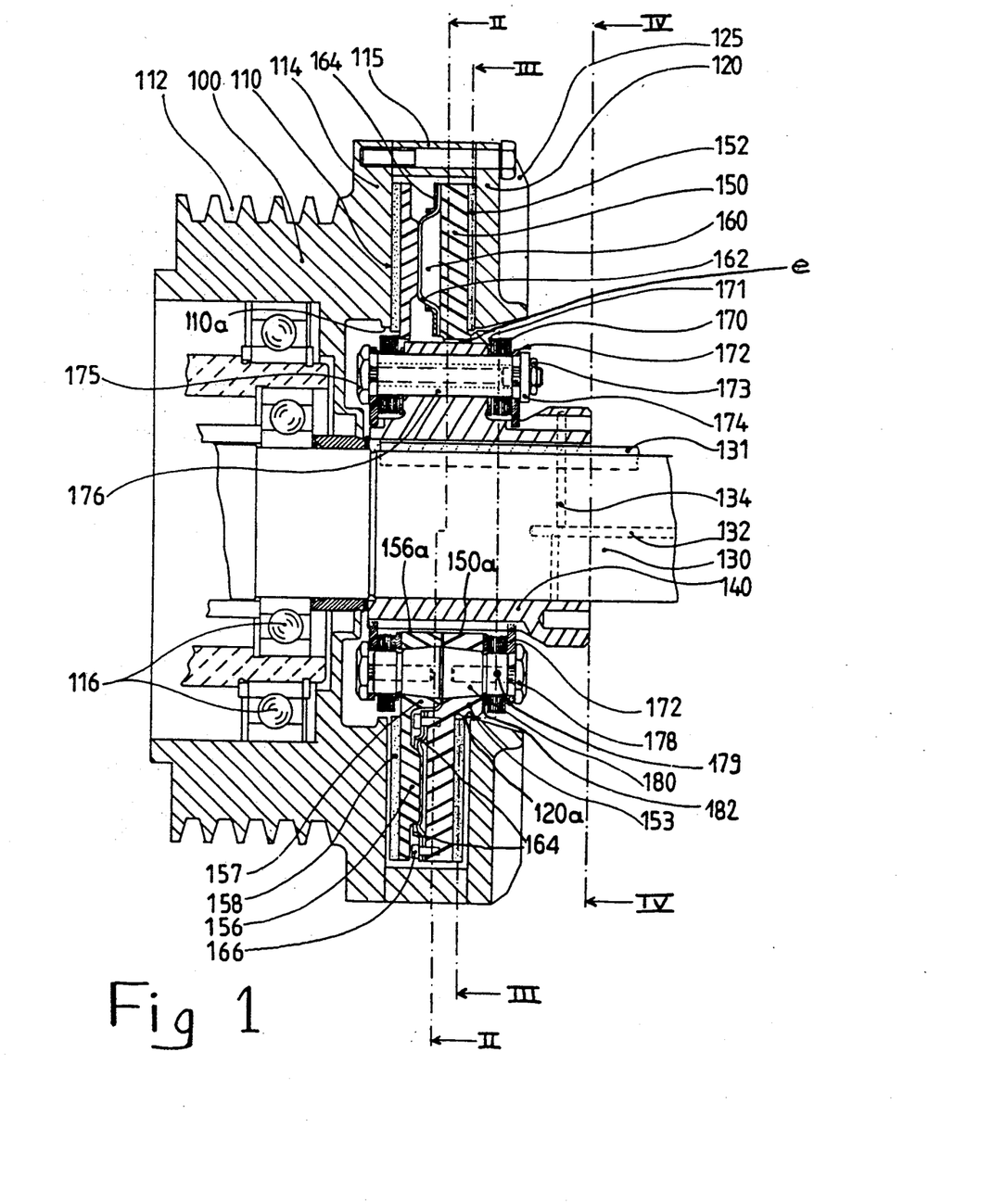
FIG. 1 is a cross sectional view taken along lines I—I of FIG. 2.

The present invention is particularly useful when incorporating a clutch with elastic coupling as illustrated in FIG. 1. The realization of this clutch is described in the context of the coupling existing between a driving flywheel and a driven shaft in a machine designed for converting the plate-shaped elements. It has been understood that the conception comprised in the realization as described hereinafter can be used in an equivalent way in the case of a driving shaft and a driven flywheel or a shaft driving a second coaxial shaft fitted on the flywheel at the outlet of any drive motor.

As shown in FIG. 1, a shaft or axle 130 extends through the clutch and has an end mounted by ball bearings 116 coaxially in the interior of a flywheel 100. When rotating, the ball bearings uncouple the shaft 130 and the flywheel 100 so that they may rotate independent of each other or may be stopped relative to each other. On a periphery, the flywheel 100 has a row of grooves 112 designed for taking up the transmission belts imparting a rotary motion to the flywheel 100. One side or end of the flywheel 100, for example, as illustrated on the right-hand side of the FIG. 1, has a radially extending bulge 114 which is directed radially outward and forms a first flange 110 having a first clutch surface extending in a plane perpendicular to the axis of the flywheel. The radial bulge 114 adjacent its periphery has an axially extending periphery wall or strut 115 which mounts a lid or disk 120 which extends parallel to the first flange. The lid or disk 120 has a second clutch surface facing the first clutch surface and on an opposite surface is provided with radial cooling wings or fins 125. As illustrated, the first and second clutch surfaces are parallel annular surfaces which have an inner periphery formed by openings 110a and 120a, respectively.

Figure 2:
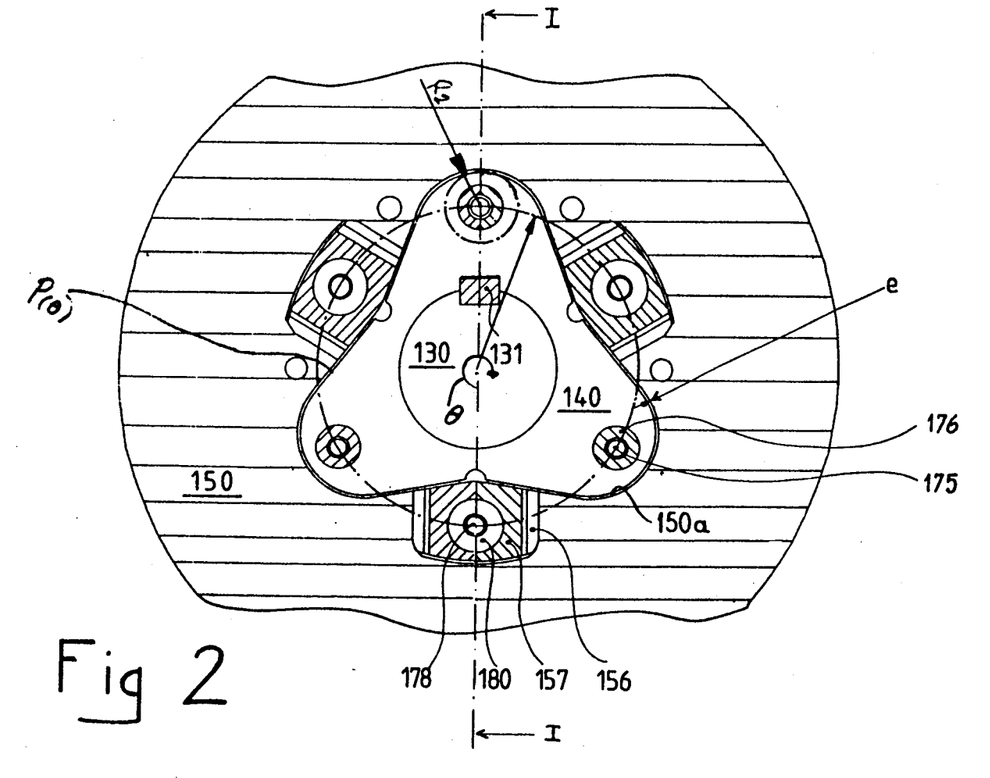
FIG. 2 is a cross sectional view taken along lines II—II of FIG. 1.

A circular pressure plate 150 and a circular counter-plate 156 are disposed between the first and second clutch surfaces and are mounted coaxially on the shaft by means for mounting, which includes a hub 140 which is secured on the shaft 130 by a key 131. The hub 140 has an axial extent sufficient to extend through the apertures 110a and 120a of the first flange 110 and the disk 120. As best illustrated in FIG. 2, the hub 140 has a periphery with a polygonal shape, such as a triangular shape with three rounded corners and slightly concaved sides. Adopting as an original axis of polar coordinates, a straight line such as the line I—I passing through the center of the axle 130 and the key 131 and furthermore adopting as an original center of the polar coordinates, the center of the axle 130, the peripheral shape of the hub 140 can be described by a polar coordinate equation $$P(r) = R1 + R2 \sin(3\Theta)$$

wherein $\Theta$ has a value between 0 and 2 pi, wherein R1 represents the radius of a basic circle and R2 is the amplitude of the cyclic variation in compliance with the angle for three alternations resulting in three rounded corners of the hub.

As illustrated in FIG. 1, the plate 150 has a central opening 150a and a plate 156 has a central opening 156a. These openings 150a and 156 as best illustrated in FIG. 2 have a configuration matched to the outer periphery of the hub 140 but are slightly larger so that there is a spacing e between the periphery of the hub 140 and opening 150a. Since the opening such as 150a and 156a conform to the outer periphery of the hub 140, they will have convex portions adjacent the concave sides of the hub. In the middle of each of these convex portions, the plates 150 and 156 have bosses 153 and 157 respectively. As illustrated in FIG. 1, the bosses 153 are on a surface of the plate 150 facing away from the counter-plate 156 while the bosses 157 on the counter-plate 156 are on a surface facing towards the plate 150. The spacing of the bosses is illustrated by the bosses 157 of the plate 156 in FIG. 2 and by the bosses 153 of the plate 150 in FIG. 3. The bosses on these two plates are axially aligned.

The plate 150 on the side having bosses 153 is provided with a friction disk 152 which cooperates with the second clutch surface of the flange or disk 120. The counter-plate 156 on a surface facing away from the surface having the bosses 157 has a friction disk 158 which cooperates with the first clutch surface on the flange 110.

The means for coupling the plates to the shaft 130 include each of the corners of the hub 140 having a bore extending parallel to the axis of the hub for receiving a cylindrical axle 176. As illustrated in FIG. 1, this axle 176 is a sleeve and protrudes on both sides to provide two cylindrical supports for each corner.

The bosses 153 contain a tapered aperture which converges radially inward as the aperture approaches the surface supporting the friction disk 152. A tapered stud 180, which has a conical portion extending into a cylindrical support 179 is disposed in each of the tapered apertures. The tapered stud 180 has a threaded axial bore to receive a threaded member 178 having an enlarged head. Each of the bosses 157 also have the tapered aperture which converges inward as the aperture approaches the surface supporting the friction disk 158. A tapered stud similar to the stud 180 is disposed in this aperture as illustrated in FIG. 1.

The means for connecting the plate such as 150 to the hub 140 includes a stack of lamellae 170 (see FIGS. 1 and 3) connecting every cylindrical axle 176 at the rounded corners of the hub 140 to the two supports 179 of the tapered studs 180 received in the two bosses 153 situated opposite the center of the two corresponding adjacent sides of the hub. In other words, a first stack of lamellae 170 extends clockwise to connect the cylindrical axle 176 of the first corner of the hub 140 to a support 179 of the tapered stud 180 which is inserted in the aperture in the next boss 153 of the plate 150. Moreover, a second stack of lamellae 170b connects the same support 179 to the front end of a cylindrical axle 176b of a second subsequent round corner of the hub 140. In a similar manner, the other two bosses are connected to the third corner and also to the first and second corners. The use of lamellae is disclosed in U.S. Pat. No. 3,981,382 for connecting a clutch plate to a housing and the disclosure of this patent is incorporated by reference thereto.

Figure 3:
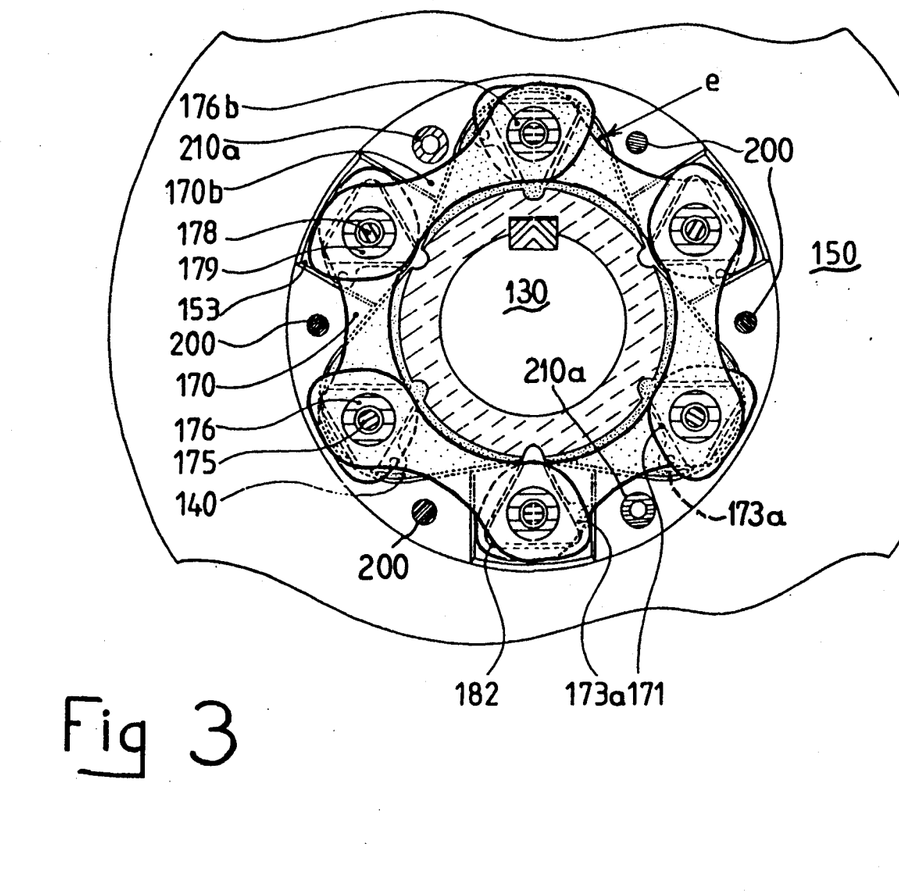
FIG. 3 is a cross sectional view taken along lines III—III of FIG. 1.

As evidenced in FIG. 3, the stacks of lamellae extending from the support, such as 179 to the cylindrical axle 176 and the other stack 170b going to the axle 176b are alternately arranged so that between two lamellae 170b is a lamellae 170. Considering the stiffness of every lamellae unit, this connection due to successive stacking of the lamellae allows keeping the bosses 153 and the plate 150 apart with the space e from the hub 140.

As shown in FIG. 1, a connection achieved by means of successive stacks of lamellae 170 occurs on the opposite sides of the hub 140. Thus, the hub 140 on the left side is connected to the counter-plate 156 by a series of stacks of lamellae which are identical to the stacks forming the connection to the plate 150. The stacks form a closed figure with six sides.

The first lamellae in every stack are in no way kept directly against the front side or surface of the hub and plate or counter-plate but are held disengaged by a distance piece 171 or 182 which have a shape of an equilateral triangle which is shown in FIG. 3.

In considering the hexagonal arrangement of the lamellae stacks 170, it may be noticed that appropriate arranged equilateral distance pieces provide a first bend line for every lamellae. On account of the importance of this particular arrangement, the distance pieces 171 or 182 are held in position by a pin which fits through an offset eyelet 173a (see FIG. 3). In similar way, as may be better perceived from FIGS. 1 and 4, the last lamellae of every stack is protected by a distance piece 172 which is also of an equilateral triangular shape and will function identically to the above described distance piece 171 and 182. It is noted that each of these distance pieces has one of the points extending radially inward toward the axis of the shaft 130.

At the level of each of the bosses 153 or 157, the lamellae stacks are held in position around the support 179 due to a broad headed screw 178 being inserted in the bore of the stud 180. Inversely, at the height or level of every corner of the hub 140, it has been seen more appropriate to use a threaded bolt 175 which extends through the cylindrical sleeve forming the cylindrical axle 176. A head of this bolt 175 holds the stack of lamellae on one side in position whereas the lamellae on the opposite side of the hub are held by a washer 174 and nut 173, which is threaded onto the end of the bolt 175.

Figure 4:
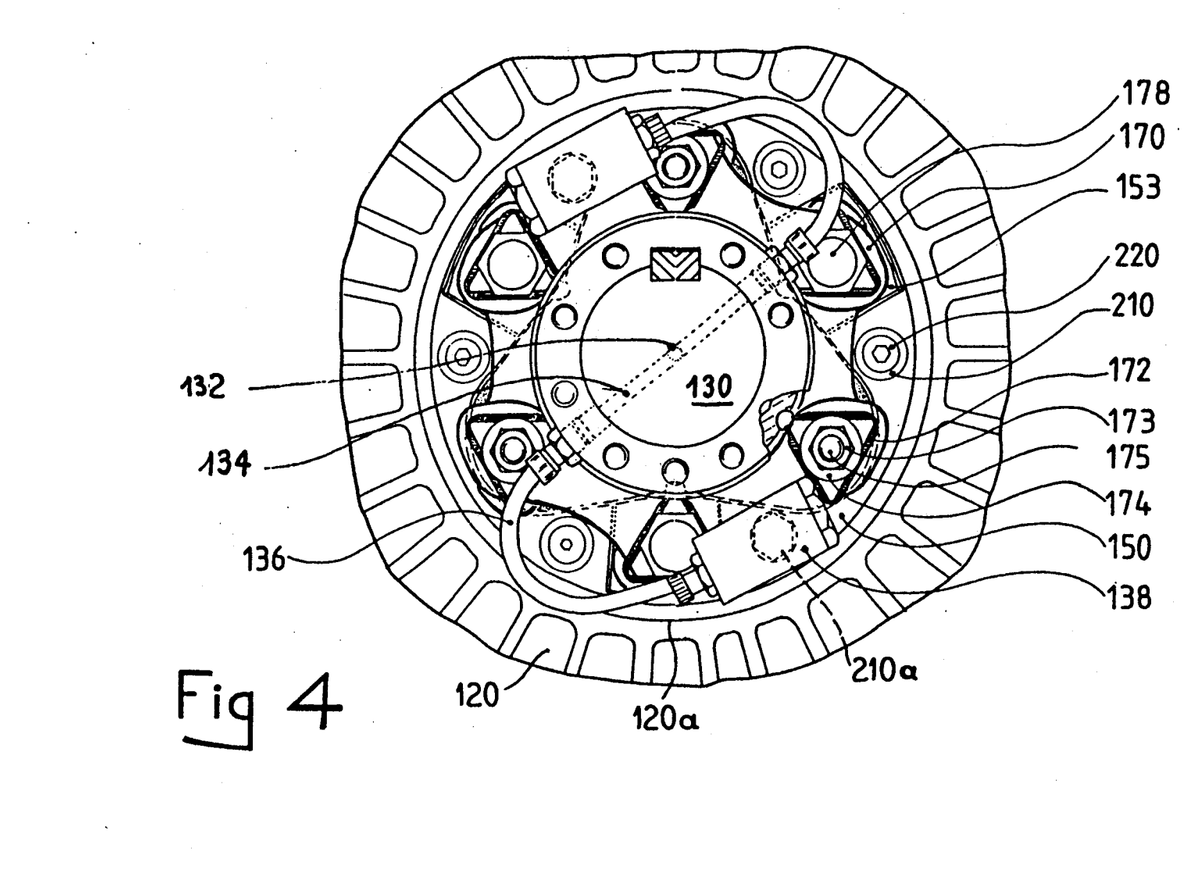
FIG. 4 is a cross sectional view taken along lines IV—IV of FIG. 1.

In order to move the two plates 150 and 156 into engagement with the friction surfaces, means for biasing or urging are provided and the means includes a pneumatic device. This device includes a compressed air supply circuit having air under pressure, for example, at a value of 3 bars. The circuit is made up as illustrated in FIG. 4 by a central or axial duct 132 in the shaft 130. This duct 132 extends into two ducts 134 which extend radially outward and are connected by flexible ducts 136 which lead to two distributors 138 which are arranged immediately on a pressure plate 150 in a symmetrical fashion with regard to the rotary axis so that the plate will not be unbalanced. The air in the distributor is conducted by a duct 210a (FIGS. 3 and 4) into an expansion chamber 160 (see FIG. 1) which consist of a membrane 162 itself maintained against the face of the plate 150 by rims 164 and screws 166. The membrane can be pressed onto the front side of the counter-plate 156.

Figure 5:
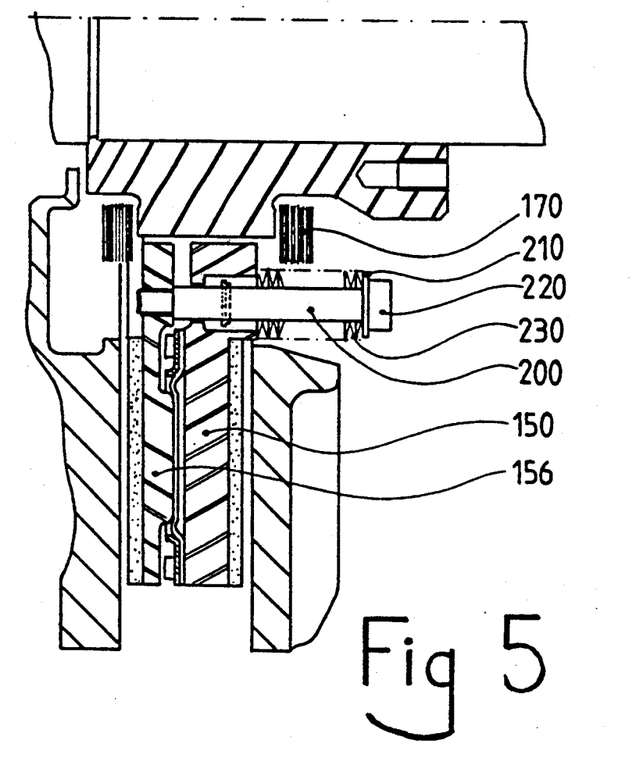
FIG. 5 is an enlarged cross-sectional view of a pull-back means for holding the plate and counter-plate against one another.

In this clutch, there are pull-back means for holding or pulling the two plates 150 and 156 with pressure pads 152 and 158 respectively, out of engagement with the clutch or friction surfaces of the flange 110 and disk 120. The pull-back means includes four spring loaded devices which are illustrated in FIG. 5, and will hold the plates firmly together in the event of compressed air missing within the chamber 160. Each of the spring loaded devices includes a rod 200, which at one end has a head 220 and has an opposite end which is threaded. The rod 220 extends through a bore in the plate 150 and has the threaded end threaded into a threaded bore in the counter-plate 156. Elastic washers or spring washers 230 of an adequate number form the spring acting between the washer 210 and a surface of the pressure plate 150. As illustrate in FIG. 5, the spring 230, which is shown in an expanded state, urges the washer 210 and the head 220 towards the right-hand side and thereby pulls or shifts the counter-plate 156 in the same direction. The spring simultaneously pushes the plate 150 towards the left-hand side of FIG. 5. There are four of these spring devices provided in the clutch in their position around the shaft 130 is illustrated by the rods 200 in FIG. 3.

The clutch operates in the following way. In FIG. 1, the lower half represents the plate and counter-plate in a declutched position, whereas the upper half represents the plate and the counter-plate in the clutched-in or engaged position. In fact, with pneumatic pressure failing within the chamber 160, the plates are held against one another by the four pull-back means or spring devices illustrated in FIG. 5, and the corresponding friction disks 152 and 158 are disengaged from the clutch or friction surfaces of the flanges. With the compressed air applied through the ducts 132 and arriving into the chamber 160, the chamber expands and then pushes the plate 150 and counter-plate 156 apart from one another. However, considering that these two plates are connected to each other by or through the hub 140 only by flexible lamellae which is stiff on account of their number both under tension and compression and considering also that there is no frictional forces between these plates, the hub is held tight owing to the space e. Thus, the plate 150 is easily shifted towards the right-hand side and the counter-plate 156 towards the left-hand side until their friction disks 152 and 158 respectively come in contact with the corresponding friction surfaces of the disk 120 and flange 110. The rotary torque of the flywheel 100 is then transmitted to the disk and the plate and will then be transmitted from both to the hub 140 through the stacks of lamellae. These lamellae operate essentially in tension except in the event of a quick deceleration. Owing to the considerable number of lamellae in each stack on both sides, a strong torque rate becomes transmissible whereas the plates remains permanently floating about the hub 120.

Inversely and for the purpose of declutching, the pneumatic pressure within the chamber 160 is released and the compressed springs 230 of each of the pull-back means will expand to bring the plates again towards one another. As there is still no friction in the lengthwise direction between the plates and the hub and on account of the lateral flexibility of the stacks of lamellae, the springs 230 can easily impart this motion to the plate and counter-plate.

Viewed as a cross section, the periphery of the hub 140 of the above-described clutch has as a whole a triangular shape, and the inner peripheries of the central apertures 150a and 156a of the plate 150 and counter-plate 156 have an identical shape, although slightly larger. In the case of the less powerful clutches, it will be possible to conceive this general shape rather as an oval with just two hub pivots used at the two corners or ends and two plate pivots on the sides. This arrangement will then require only four stacks of lamellae on both sides for connection purposes. Inversely, in the case of more powerful clutches, it is conceivable to use generally a cross or rectangular element with four corners or a star-shape construction with five or six corners or points. Then, 8, 10 or 12 lamellae stacks respectively would then be needed on both sides to insure the connection between the hub and the plate and hub and counter-plate.

As can be noticed from the above description, the clutch has very short response times without hazardous backlash, shocks or vibration likely to appear. Moreover, as the stroke of this plate is only limited by the flexibility of the stack of lamellae which are usually of a very broad shape, this device allows the use of the friction disks much longer then previous devices. This will result in less intervention on the clutch for repair of worn parts which result in less unproductive downtime.

Although various modifications may be suggested by those versed in the art, it should be understood that I wish to embody within the scope of the patent granted hereon all such modifications as reasonably and properly come within the scope of my contribution to the art.

I claim:

1. In a clutch for coupling a first shaft to a second shaft extending coaxially to the first shaft, said clutch having a pair of circular flanges held in a spaced-apart arrangement with friction surfaces facing each other, said flanges being secured to said first shaft, an annular plate and counter-plate each supporting a friction disk being arranged with the friction disks facing away from each other and positioned opposite the friction surfaces of said flanges, means for urging the plate and counter-plate away from each other to engage the friction disks with the friction surfaces of said flanges, pull-back means for pulling the plate and counter-plate towards each other and out of engagement with the friction surfaces and mounting means for holding the plate and counter-plate on said second shaft, the improvement comprising the mounting means including a hub being keyed to the second shaft, said hub having a periphery having at least two rounded corners interconnected by concave sides, said plate and counter-plate each having an aperture with an inner periphery corresponding to the periphery of said hub and of a slightly larger size to enable the hub to be disposed in said apertures with a slight spacing, each of said plate and counter-plate having a support opposite each concave side of the hub midway between adjacent corners, a plurality of stacks of individual lamellae connecting each corner of the hub to adjacent supports on said plates, said stacks of lamellae forming an enclosed figure having at least four sides to interconnect each of said plate and counter-plate to said hub.

2. In a clutch according to claim 1, wherein each of the stacks of lamellae is mounted on the corner of the hub by means of a cylindrical axle extending through the hub at said corner, said cylindrical axle having threaded means for holding the stacks on said axle.

3. In a clutch according to claim 2, wherein each of the supports on the plate and counter-plate include a cylindrical portion for receiving the other end of each of the stacks connected to adjacent axles of said hub.

4. In a clutch according to claim 3, wherein each of the cylindrical supports on the plates and counter-plate comprises a tapered stud received in a tapered bore in the plate and counter-plate, said tapered stud having the cylindrical support for receiving the stack, said cylindrical support having an axial threaded bore for receiving a threaded member with a head for holding the stack of lamellae on said cylindrical support.

5. In a clutch according to claim 2, wherein the stacks are held an adequate distance from the surfaces of the hub and each of the plates as well as from the fastening means holding the stack on the support by a spacing plate having the shape of a isosceles triangle having one of the apex of the triangle directed towards the axis of the second shaft, said one apex having an angle equal to 180°/n wherein n is the number of rounded corners of the periphery of said hub and n ≧ 2.

6. In a clutch according to claim 5, wherein said hub has a triangular configuration with three corners and n equals 3, and said stacks of lamellae form a hexagon.

7. In a clutch according to claim 1, wherein the hub has a triangular shape periphery with three rounded corners connected by three concave surfaces, each of said plates have three supports, said stacks of lamellae connecting the supports of said plates to the hub forming a hexagon.

8. In a clutch according to claim 7, wherein the means securing each of the stacks to the rounded corners of the hub include a cylindrical sleeve extending through a bore in said rounded corner and having end portions extending from both sides of the hub for receiving one end of the two stacks engaged thereon, a bolt having a head at one end and a thread at the opposite end extending through said cylindrical sleeve and receiving a nut on the threaded end for holding the stacks on the two end portions.

9. In a clutch arrangement according to claim 8, wherein a spacer is positioned between each of the stacks of lamellae and a surface of the hub and the plates respectively, said spacer being an equilateral triangle with an apex being directed towards an axis of rotation of said second shaft.

10. In a clutch according to claim 8, wherein each of the supports on the plate and counter-plate is formed by a tapered stud received in a tapered bore having a cylindrical portion extending on the side of the plate having the stack of lamellae, said cylindrical portion having an axial threaded bore receiving a headed fastening member for securing the stack of lamellae on said support.

11. In a clutch arrangement according to claim 10, which includes spacing elements disposed between each of the stacks of lamellae and the surface of the hub and surfaces of the plate and counter-plate as well as between the stack of lamellae and the fastening device, said spacing elements having an equilateral triangular shape with an apex of said element being directed towards the axis of rotation.

* * * * *